United States Patent [19]

Vuong

[11] Patent Number: 4,500,324

[45] Date of Patent: Feb. 19, 1985

[54] METHOD OF REDUCING THE NICKEL CONTENT IN WASTE WATER

[75] Inventor: Dinh-Cuong Vuong, Port Arthur, Tex.

[73] Assignee: Texaco Inc., White Plains, N.Y.

[21] Appl. No.: 507,866

[22] Filed: Jun. 27, 1983

[51] Int. Cl.³ .................................................. C02F 1/54
[52] U.S. Cl. ..................................... 48/197 R; 75/119; 210/631; 210/712; 210/718; 210/725; 210/727; 210/729; 210/787; 210/912; 423/143
[58] Field of Search ...................... 48/197 R, 200–202; 75/108, 109, 119; 210/620–622, 631, 712, 718, 719, 721, 722, 725, 727, 728, 729, 732, 750, 759, 912, 787; 423/140, 143

[56] References Cited

U.S. PATENT DOCUMENTS

| | | | |
|---|---|---|---|
| 3,531,265 | 9/1970 | Dille | 210/722 |
| 3,740,331 | 6/1973 | Anderson et al. | 210/912 |
| 3,922,330 | 11/1975 | Pittie et al. | 75/108 |
| 4,014,786 | 3/1977 | Potter et al. | 210/519 |
| 4,141,696 | 2/1979 | Marion et al. | 48/197 R |
| 4,211,646 | 7/1980 | Westbrook et al. | 210/631 |
| 4,322,390 | 3/1982 | Tolley et al. | 423/33 |
| 4,419,246 | 12/1983 | Jayawant | 210/722 |
| 4,425,228 | 1/1984 | Lynn et al. | 210/912 |
| 4,432,880 | 2/1984 | Talbot | 210/912 |

FOREIGN PATENT DOCUMENTS 56-47526  4/1981  Japan ................................. 423/143

937344  6/1982  U.S.S.R. ............................. 210/725

Primary Examiner—Peter Hruskoci
Attorney, Agent, or Firm—Robert A. Kulason; Albert Brent

[57] ABSTRACT

The nickel content of a waste water stream, such as a stream of grey water that is separated in the decanting operation of a partial oxidation process or blow-down water from a gas quench cooling and/or scrubbing operation is reduced to below 1 mg/l to produce an environmentally upgraded water stream. In the process, the dilute waste water stream containing nickel impurities at a temperature in the range of about 60° to 220° F. is mixed with a water soluble material selected from the group consisting of formaldehyde, ionizable polysulfide salt, and hydrogen peroxide; and with dimethyl glyoxime. The pH is adjusted to a value in the range of over 7 to 11 by the addition of a base material and a water insoluble nickel precipitate forms. The precipitate and other insoluble matter are separated from the water by means of at least one conventional solids-liquid separator, and a stream of upgraded water is produced. At least a portion of the upgraded water stream may be recycled to the gas quench cooling and/or scrubbing operation. The nickel content of the upgraded water stream has been reduced to conform with environmental regulations. Further, build-up of nickel in the recycle circulating water system and the formation of troublesome nickel carbonyl are prevented.

27 Claims, No Drawings

METHOD OF REDUCING THE NICKEL CONTENT IN WASTE WATER

BACKGROUND OF THE INVENTION

This invention relates to a method for reducing the soluble and insoluble nickel impurities in waste water. More specifically, it relates to a process for reducing the total nickel content of waste water, such as grey water or blow-down water from a partial oxidation process, to produce an environmentally acceptable discharge stream, or to prevent the build-up of nickel in the circulating water system and the formation of nickel carbonyl.

Nickel from soluble and insoluble nickel compounds may be present in dilute waste water from chemical processes such as from the partial oxidation process in the amount of about 1 to 15 milligrams per liter (mg/l). When such water is recycled in the process, the nickel concentration in the system may greatly increase. Environmental regulations may require that prior to discharge of such water into a sewer, the total concentration of nickel from water soluble and insoluble nickel compounds be reduced to less than 1 mg/l.

In the process for producing synthesis gas, reducing gas, or fuel gas by the partial oxidation of a liquid hydrocarbonaceous fuel, such as a liquid hydrocarbon fuel, oxygen-containing hydrocarbonaceous fuel or a slurry of a solid carbonaceous fuel with a water and/or liquid hydrocarbon carrier, it may be necessary to reduce the total nickel content in the grey water from the decanter, or blow-down water from the gas quench cooling and/or scrubbing operation, to an environmentally acceptable level prior to discharge from the system. Further, it is desirable to prevent the build-up of nickel in the quench cooling and/or scrubbing circulating water system in the partial oxidation process in order to avoid the formation of volatile nickel carbonyl. Nickel carbonyl may decompose and form undesirable nickel deposits on heat exchanger walls. For example, if traces of the $H_2S$ remain in the gas, nickel sulfide may accumulate on the heat exchanger walls with deleterious effects on the metallurgy. Further, in low temperature catalytic synthesis, nickel carbonyl may decompose in mixtures of hydrogen and carbon monoxide. Nickel may then accumulate in homogenous and heterogeneous noble metal catalyst systems and adversely affect the selectivity and activity of the catalyst.

Coassigned U.S. Pat. No. 4,211,646, which is incorporated herein by reference, relates to a process for removing cyanide, sulfide, ammonia, soot and insoluble metals in the scrubbing water from the partial oxidation process. Ferrous sulfate and lime addition, followed by clarification, filtration, and steam stripping are employed. However, it was found that soluble nickel cannot be consistently reduced to very low limits by that process.

It was unexpectedly found that by the subject process, the concentration of nickel in waste water, such as in grey water from the decanter in the carbon recovery system of the partial oxidation process, or blow-down water from the gas quench cooling and/or scrubbing operation, may be consistently reduced to environmentally acceptable levels e.g. less than 1 mg/l, such as below about 0.5 mg/l. Further, these low levels could not be consistently achieved by merely adding dimethyl glyoxime to the grey water.

SUMMARY OF THE INVENTION

This is a process for reducing soluble and insoluble nickel impurities in waste water, such as grey water from the decanting operation of a partial oxidation process, or blow-down water from the gas quench cooling and/or scrubbing operation. In this process, each liter of waste water at a temperature in the range of about 60 to 220° F. is mixed with about 10 to 1000 mg. of a water soluble material selected from the group consisting of formaldehyde; ionizable polysulfide salt, e.g., alkali metal polysulfide or ammonium polysulfide, and hydrogen peroxide. About 2 to 10 moles of dimethyl glyoxime per atom of dissolved nickel is also mixed with the water. The pH of the dilute mixture is adjusted to a desired value in the range of over 7 to 11, by the addition of a base material, e.g., NaOH, $Ca(OH)_2$, when the pH is not already at said desired value. A precipitate comprising nickel-dimethyl-glyoxime complex forms and is separated from the water along with at least a portion of any insoluble nickel and its compounds and at least a portion of any other insoluble impurity, e.g., particulate carbon, soot, and the metals and the sulfides of the metals V and Fe, by means of at least one conventional solids-liquid separator. Suitable solids-liquid separators may be selected from the group consisting of filter, centrifuge, hydroclone, settler, clarifier, or combinations thereof. The nickel content of the waste water is thereby consistently reduced to an environmentally acceptable discharge level, and nickel is prevented from building up in recycle circulating water systems.

In one embodiment, in addition to the soluble nickel impurities, the waste water contains at least one of the following soluble and/or insoluble impurities: nickel and nickel compounds, formates, cyanides, ammonia, a halide of a metal or ammonia, the metals and the sulfides of the metals V and/or Fe, particulate carbon and soot. The waste water, e.g., grey water, may or may not be degassed prior to processing. The concentration of water soluble and insoluble impurities may be reduced by the following steps: mixing the grey water at a temperature in the range of about 60° F. to 220° F. with dimethyl glyoxime and a water soluble material from the group HCHO, ionizable polysulfide salt, such as an alkali metal polysulfide or ammonium polysulfide, and $H_2O_2$, a ferrous compound, e.g., ferrous sulfate or ferrous chloride, and a base material, e.g., NaOH or Ca(OH)$_2$ to adjust the pH of the grey water mixture to a desired value in the range of over 7 to 11; precipitating out water insoluble nickel-dimethyl glyoxime complex, CN-containing sludge, e.g., iron cyanide, iron hydroxide, and iron sulfide; separating from the water the nickel-dimethyl glyoxime complex, inorganic CN-containing sludge, iron sulfide, iron hydroxide and at least a portion of any other water insoluble matter, e.g., particulate carbon, soot, nickel and its compounds, e.g., nickel sulfide, and the metals and the sulfides of the metals V and/or Fe from the water in at least one conventional solids-liquid separator to produce a clarified water stream having a total nickel content of less than 1 milligram per liter. At least a portion of this clarified water stream may be recycled to the quench cooling and/or scrubbing zone. Other embodiments provide for removing ammonia or ammonia and formates if present in said clarified water stream by the steps of increasing the pH of the clarified water to a minimum of 11, when the pH is below 11; stripping $NH_3$ from the clarified water; introducing the $NH_3$-stripped clarified water into a conventional biological reactor after adjusting the pH to a value in the range of about 6 to 8; and removing from the clarified water in the biological reactor organic matter such as formates and any excess dimethyl glyoxime from the $NH_3$-stripped water to produce $CO_2$, a biological residue suitable for disposal, and an upgraded water stream. At least a portion of the upgraded water stream may be recycled to the gas quench and/or scrubbing zone, and the remainder may be discharged from the system. The nickel content of the upgraded water stream may be consistently reduced to an environmentally acceptable level by the subject process. Further, the nickel and ash level in the recycle circulating water system may be controlled.

DESCRIPTION OF THE INVENTION

Nickel may be found as an impurity in liquid hydrocarbonaceous fuels and solid carbonaceous fuels along with sulfur and nitrogen containing compounds. For example, nickel may be present in the range of about 3-70 parts per million in fuel oil and coal. Nickel containing liquid hydrocarbonaceous fuels are used as feedstock and reacted with a free-oxygen containing gas such as air, oxygen-enriched air, and substantially pure oxygen, and optionally with a supplemental temperature moderator, in the partial oxidation process, for the production of gaseous mixtures comprising $H_2$ and $CO$, such as described in coassigned U.S. Pat. Nos. 3,544,291; 3,998,609; 4,014,786; 4,141,696; and 4,110,359, which are incorporated herein by reference. The nickel contaminant in the feedstock is converted in the gasification process to precipitated nickel metal, nickel sulfide, and to a surprisingly high level of soluble nickel. Particulate carbon is also formed in the reaction zone of the partial oxidation gas generator and may sequester a portion of the metals and the sulfides of the metals Ni, V, and Fe, e.g., ash to form soot. These nickel products leave the reaction zone entrained in the hot raw gas stream and may be then transferred to the quench cooling and scrubbing waters.

HCN and $H_2S$ are trace impurities in the raw gas stream from the partial oxidation gas generator and form compounds with the nickel. For example, there is water soluble $Ni(CN)=_4$, and also NiS which is water soluble in the alpha or beta form and water insoluble in the gamma form. The hot raw gas stream from the partial oxidation gas generator with entrained matter, e.g., particulate carbon, ash, soot and slag, is cooled in quench water at a temperature in the range of about 300° to 600° F. and may be then further scrubbed with water to remove entrained particulate matter. Alternatively, the hot raw gas stream is cooled to a temperature in the range of about 350° to 700° F. by indirect heat exchange with water in a gas cooler followed by direct contact with water in a scrubber. In one embodiment, such as described in coassigned U.S. Pat. No. 4,110,359, the hot raw gas stream is split into two gas streams. The separate gas streams are then cooled and scrubbed with water by the two different cooling modes previously mentioned. Substantially all of the entrained matter is transferred to the quench and/or scrubbing water to produce a clean stream of synthesis gas, reducing gas, or fuel gas.

To prevent the build-up of impurities in the quench and scrubbing water, periodically it may be necessary to blow-down a portion of the quench and scrubbing water to the sewer and replace it with fresh water. It is important that the soluble and insoluble nickel content in the blow-down water stream conforms to environmental regulations.

When the concentration of soluble and insoluble nickel compounds build up in the quench and/or scrubbing waters where they are contacted by high pressure carbon monoxide, nickel carbonyl vapor may form in the quench tank and more so at lower temperatures in the carbon scrubber. The small amount of nickel carbonyl formed, e.g., about $10^{-10}$ to $10^{-8}$ moles of nickel carbonyl per mole of raw gas, may create technical problems in the subsequent handling and usage of the gas. For example, upon reheating the gas stream to over 600° F., the nickel carbonyl may decompose. Nickel deposits may then accumulate on heat exchanger walls with deleterious effects on metallurgy. Thus, if traces of sulfide remain in the gas, the nickel sulfide that is formed can attack austenitic steels. Likewise, any nickel carbonyl in mixtures of hydrogen and carbon monoxide, as used for low temperature chemical synthesis, may decompose. The nickel may then accumulate in the catalyst system and adversely affect the selectivity and activity of the homogeneous or heterogeneous noble metal catalyst systems involved.

By the subject process the soluble and insoluble nickel compounds in the quench and scrubbing waters are reduced to an acceptable level so that the aforesaid problems are avoided.

The term "grey water", as used herein, as one type of waste water, pertains to the dilute water stream that is separated in a decanter from a dispersion of carbon-liquid organic extractant. The decanting operation is part of the carbon-recovery operation in the partial oxidation process whereby at least a portion of the dilute carbon dispersion of quench and scrubbing waters is reclaimed by removing a large portion of the particulate carbon, soot and ash therefrom. At least a portion of the grey water from the decanter is treated in accordance with the subject process to produce upgraded water. The waste water stream from the quench zone of a partial oxidation system is described in greater detail in coassigned U.S. Pat. No. 4,211,646, which is incorporated herein by reference.

In the decanting operation a stream of quench and/or scrubbing water containing dispersed matter, e.g., particulate carbon, soot and ash, is mixed with a liquid organic extractant stream and introduced into a one or two stage decanter where grey water separates out and settles to the bottom. The grey water comprises water containing 100 to 500 parts per million by weight of particulate carbon and about 20 to 85 wt. % of the water insoluble ash. Ash comprises the metals and the sulfides of the metals selected from the group nickel, vanadium, iron, and mixtures thereof. The grey water may also contain gaseous impurities selected from the group $H_2S$, $CO_2$, $NH_3$, and mixtures thereof. A dispersion comprising particulate carbon, soot, liquid organic extractant and the remainder of the insoluble ash floats on the grey water layer. The two streams are separately removed from the decanter. At least a portion, e.g., 5-100 vol. %, of the stream of grey water, with or without degassing, is treated by the subject process to produce upgraded water, after which, at least a portion, e.g., 5-100 vol. %, of the upgraded grey water is recycled to the quench cooling and scrubbing zone. The remainder of the upgraded grey water stream may be discharged from the system. The decanting operation is more fully described in coassigned U.S. Pat. No. 4,014,786, which is incorporated herein by reference.

The term "degassing" is intended to mean the removal of gaseous impurities selected from the group consisting of $H_2S$, COS, $CO_2$, $NH_3$, and mixtures thereof. Degassing of grey water in a flash column is described in coassigned U.S. Pat. No. 4,141,696, which is incorporated herein by reference.

Periodically, an environmentally acceptable blow down stream of waste water from the quench tank and/or scrubbing operation may be discharged from the system. The nickel contents of the upgraded grey water and the blow down waste water streams have been reduced by the subject process to a level that satisfies enivronmental regulations.

The subject process pertains to a method for reducing the soluble and insoluble nickel containing impurities along with any other water insoluble matter in a dilute waste water stream such as grey water from a decanter or blow-down water and comprises the steps of: (1) mixing the stream of dilute waste water, with or without degassing, and containing less than 4 wt. % total solids (dissolved and suspended) including nickel impurities and optionally carbon-soot and ash at a temperature in the range of about 60° to 220° F., such as about 200° to 220° F. with the following: (a) a material selected from the group consisting of formaldehyde; ionizable polysulfide salt, e.g., alkali metal polysulfide or ammonium polysulfide, for example $NaS_x$, $KS_x$, $LiS_x$, $NH_4S_x$, and mixtures thereof, where $x=2$ to 8; and hydrogen peroxide; and (b) dimethyl glyoxime; (2) adjusting the pH of the dilute mixture in (1) to a desired value in the range of over 7 to 11, by the addition of a base material such as NaOH or $Ca(OH)_2$, when the pH is not already at the desired value; (3) precipitating out from the waste water stream from (2) a water insoluble nickel-dimethyl glyoxime complex; and (4) separating the nickel-dimethyl-glyoxime complex along with at least a portion of any other water insoluble matter, e.g., nickel and its compounds, particulate carbon, soot, the metals and the sulfides of the metals V and/or Fe in the water stream from (3) in at least one conventional solids-liquid separation means to produce a stream of upgraded water in which the total nickel content has been reduced to less than 1 milligram per liter.

In step (1) of the process, a sufficient amount of the material listed in (a) is mixed with the waste water so that substantially all of the nickel in the soluble nickel compounds in the waste water is converted to a form which can be precipitated by the dimethyl glyoxime. For example, this amount may be in the range of about 10 to 1000, such as about 20 to 500 milligrams (mg) of the material selected in (a) per liter of waste water. The amount of dimethyl glyoxime added in (b) comprises about 2 to 10, such as about 3 to 5 moles of dimethyl glyoxime per atom of dissolved nickel. The materials may be separately mixed with the waste water in the above order: i.e. first (a) and then (b). In one embodiment a flocculent/coagulant, such as a cationic electrolyte, in the amount of about 1 to 10 parts per million (by weight), may also be mixed with the waste water.

The conventional solids-liquid separation means in step (4) is selected from the group consisting of filter, centrifuge, hydroclone, clarifier, settler, or combinations thereof. In one embodiment the solids-liquid separation means comprises a plurality of conventional hydroclones connected in parallel and/or series.

In another embodiment, the waste water is grey water, with or without degassing, from the decanting operation of the partial oxidation process. At least a portion of the soluble and insoluble nickel and nickel compounds are removed from the grey water along with at least a portion of the other soluble and insoluble impurities that may be present, e.g., the metals and the sulfides of the metals of V and/or Fe, particulate carbon, soot, cyanide, formates, and ammonia. Halides may also be present. This embodiment comprises the steps of: (1) mixing the grey water from the decanting operation of a partial oxidation gas generating system, with or without degassing, and at a temperature in the range of about 60° to 220° F. with the following: (a) a material selected from the group consisting of HCHO, ionizable polysulfide salt, e.g., alkali metal polysulfide or ammonium polysulfide, and $H_2O_2$; (b) dimethyl glyoxime; (c) a ferrous compound; and (d) a base material, e.g., NaOH or $Ca(OH)_2$ so as to adjust the pH of the grey water mixture to a desired value in the range of over 7 to 11; (2) precipitating out water insoluble nickel-dimethyl glyoxime complex, an inorganic CN-containing sludge, e.g., iron cyanide, iron hydroxide, and iron sulfide; and (3) separating the water insoluble materials precipitated in (2) and at least a portion of the water insoluble matter comprising nickel and its compounds, particulate carbon, soot, and the metals and the sulfides of the metals V and/or Fe, from the water stream in at least one conventional solids-liquid separation means to produce a stream of clarified water having a total nickel content of less than 1 milligram per liter. At least a portion of the clarified water stream may be recycled to the quench cooling and/or scrubbing zone. In another embodiment, ammonia is removed from the clarified water by the steps of (4) increasing the pH of the clarified water to a minimum of 11 when the pH is not already at a minimum pH of 11; and (5) stripping ammonia from the clarified water stream from (4), for example with steam. At least a portion, e.g., 5 to 100 vol. % of the $NH_3$-stripped water may be discharged from the system. Alternatively, any formates and organic material in the $NH_3$-stripped water may be removed prior to discharge. In such case, there are added the steps of (6) introducing the $NH_3$-stripped clarified water stream from (5) into a conventional biological reactor after adjusting the pH to a value in the range of about 6 to 8, and consuming or converting therein organic matter to carbon dioxide and a biological residue suitable for disposal; and (7) removing the biological residue from the biological reactor, and a separate upgraded water stream in which the total nickel content has been reduced to less than 1 milligram per liter. Advantageously, a portion of the $NH_3$-stripped clarified water stream from (5) or the upgraded water stream from (7) may be recycled to the gas quench and/or scrubbing operation in the partial oxidation process. The remainder may be safely discharged from the system.

The concentrations of materials in step (1) (a) and (b) are the same as specified previously in connection with the previous embodiment. The ferrous compound in (1) (c) may be a ferrous salt, e.g., ferrous sulfate or ferrous chloride, measured in moles in the amount of 1.2 to 10 times the moles of total cyanides (free and combined) remaining in the waste water after the reaction of the materials in (1) (a). The amount of ferrous ions introduced is sufficient to react with any remaining uncomplexed free cyanide to produce iron cyanide. The pH of the waste water may be raised stepwise in the range of over 7 to 11, for example to a level in the range of about 9-11, say 9-10. The water insoluble CN-containing sludge that precipitates out substantially comprises iron cyanide. The conventional solids-liquid separation means in step (3) has been previously specified, e.g., filter, centrifuge, hydroclone, clarifier, settler, or combinations thereof. For example, the water insoluble materials in step (3) may be separated from the water in a settler or clarifier to produce a stream of water which is then passed through a sand filter to produce said clarified water stream. Optionally, a flocculant/coagulant, such as a cationic electrolyte, may be also mixed with the grey water in step (1). Conversion of formates and other organic carbonaceous material in the waste water to carbon dioxide and a biological residue takes place in a biological reactor containing biologically active solids according to conventional procedures. The biological residue separated in step (7) may be dried and used as a fuel.

The upgraded water stream from the biological reactor may have the following approximate analysis in parts per million: less than 1.0 each-nickel, vanadium, iron, sulfide, SCN; free CN, and sulfide; less than 3.0-total CN; less than 10-biochemical oxygen demand (BOD) filtered; less than 20-ammonia; less than 40-BOD, unfiltered and total suspended solids; and less than 50-formates.

EXAMPLE

The following example illustrates the operation of the process of this invention, and it should not be construed as limiting the scope of the invention.

Waste water, e.g., blow-down water from the partial oxidation process for producing synthesis gas, such as described in coassigned U.S. Pat. No. 4,141,696, which is incorporated herein by reference was analyzed for nickel and found to contain 1.32 mg/l of soluble nickel. Formaldehyde or sodium sulfide were added to different samples of the waste water at a temperature of 90° F. and a pH of 9.5 in the concentrations shown in Table I below. 10 mg/l of dimethyl glyoxime were also added to each sample of the waste water. A precipitate formed comprising nickel-dimethyl glyoxime complex. The sample was filtered and analyzed for water soluble nickel. The final soluble nickel content in each sample of the upgraded water is shown in Table I below. The results show that the soluble nickel content in the original sample of waste water was reduced in the range of about 66 to 86% depending on the type and amount of chemical added. Further, the nickel content was reduced to below about 0.5 mg/l.

TABLE I

NICKEL REMOVAL FROM SYNGAS WASTE WATER

| Chemical Addition | | Nickel Content In Upgraded Waste Water mg/l |
|---|---|---|
| Formaldehyde mg/l | Sodium Polysulfide mg/l | |
| 10 | — | 0.44 |
| 20 | — | 0.34 |
| 50 | — | 0.21 |
| 100 | — | 0.19 |
| — | 10 | 0.53 |
| — | 20 | 0.42 |
| — | 100 | 0.26 |

Other modifications and variations of the invention as hereinbefore set forth may be made without departing from the spirit and scope thereof, and therefore only such limitations should be imposed on the invention as are indicated in the appended claims.

I claim:

1. A method for reducing the soluble and insoluble nickel containing impurities along with any other water insoluble matter in a dilute waste water stream, comprising grey water or blow-down water from a partial oxidation process for the production of synthesis gas, reducing gas, or fuel gas comprising:
    (1) mixing with said dilute waste water stream at a temperature in the range of about 60° to 220° F. (a) a water soluble material selected from the group consisting of formaldehyde, ionizable polysulfide salt, and hydrogen peroxide; and (b) dimethyl glyoxime; wherein a sufficient amount of the material from (a) is mixed with the waste water so that substantially all of the nickel in the soluble nickel compounds in the waste water is converted to a form which can be precipitated by the dimethyl glyoxime from (b);
    (2) adjusting the pH of the waste water mixture in (1) to a desired value in the range of over 7 to 11 by the addition of a base material, when the pH is not already at the desired value;
    (3) precipitating out from the waste water stream from (2) a water insoluble nickel-dimethyl glyoxime complex, and
    (4) separating the nickel-dimethyl glyoxime complex along with at least a portion of any other water insoluble matter in the water stream from (3) in at least one solids-liquid separation means to produce a stream of upgraded water in which the total nickel content has been reduced to less than 1 milligram per liter.

2. The method of claim 1 where the mixture in (1) comprises 10 to 1000 mg of the material selected in (a) per liter of dilute waste water, and 2 to 10 moles of dimethyl glyoxime for each atom of dissolved nickel.

3. The method of claim 1 wherein the insoluble matter separated in (4) includes nickel and its compounds, particulate carbon, soot, and the metals and sulfides of the metals V and/or Fe.

4. The method of claim 1 provided with the added step of introducing a flocculent/coagulant into the waste water in (1).

5. The method of claim 4 wherein said flocculent/coagulant is mixed with the waste water in (1) in the amount of about 1 to 10 parts per million.

6. The method of claim 4 wherein said flocculent-coagulant is a cationic polyelectrolyte.

7. The method of claim 1 wherein the solids-liquid separation means in (4) is selected from the group consisting of filter, centrifuge, hydroclone, settler, clarifier, and combinations thereof.

8. The method of claim 7 wherein said solids-liquid separation means comprises a plurality of hydroclones connected in parallel and/or series.

9. The method of claim 1 wherein said dilute waste water stream includes formates and the subject method is provided with the additional steps of mixing with the waste water in (1) a ferrous compound measured in moles in the amount of 1.2 to 10 times the moles of total cyanides in the waste water; and precipitating out in (3) water insoluble inorganic CN-containing sludge, iron hydroxide and iron sulfide, as well as said nickel-dimethyl glyoxime complex.

10. The method of claim 9 provided with the additional steps of increasing the pH of the upgraded water stream from (4) to a minimum of 11, when the pH is below 11; stripping ammonia from the water stream; introducing the $NH_3$-stripped water stream into a biological reactor after adjusting the pH to a value in the range of about 6 to 8, and converting said formates to $CO_2$; and removing biological residue from the biological reactor and a separate upgraded water stream.

11. The method of claim 1 where the temperature in (1) is in the range of about 200°–220° F.

12. The method of claim 1 wherein said waste water stream comprises at least a portion of the grey water, with or without degassing, from a decanter that is provided with water from the quench cooling and/or scrubbing operation of a partial oxidation process for the production of synthesis gas, reducing gas, or fuel gas by the partial oxidation of a liquid hydrocarbonaceous fuel; and provided with the step of recycling at least a portion of the upgraded water from (4) to the quench cooling and/or scrubbing operation of said partial oxidation process.

13. The method of claim 1 wherein said waste water stream comprises a blow-down stream from the gas quench cooling and/or scrubbing operation of a partial oxidation process for the production of synthesis gas, reducing gas, or fuel gas by the partial oxidation of a liquid hydrocarbonaceous fuel, oxygen-containing fuel, or a slurry of solid carbonaceous fuel with a water and/or liquid hydrocarbon carrier; and provided with the step of recycling at least a portion of the upgraded water from (4) to the quench cooling and/or scrubbing operation of said partial oxidation process.

14. The method of claim 1 provided with the steps of recycling at least a portion of said upgraded water stream from (4) to a gas quench and/or scrubbing zone, and discharging the remainder from the system.

15. The method of claim 10 provided with the step of recycling at least a portion of said upgraded water stream from the biological reactor to a gas quench and/or scrubbing zone, and discharging the remainder from the system.

16. The method of claim 1 wherein said ionizable polysulfide salt is selected from the group consisting of $NaS_x$, $KS_x$, $LiS_x$, $NH_4S_x$, and mixtures thereof, where $x=2$ to 8.

17. The method of claim 1 where the pH of the waste water mixture in (2) is adjusted to a value in the range of over 7 to 11 by the addition of NaOH.

18. In the process for the production of hot raw synthesis gas, reducing gas, or fuel gas by the partial oxidation of a nickel containing liquid hydrocarbonaceous fuel with a free-oxygen containing gas and optionally with a supplemental temperature moderator, quench cooling and/or scrubbing said hot raw gas streams with water in a quench cooling and/or scrubbing zone, processing the quench and scrubbing water and recovering a dilute stream of grey water from a decanter that substantially comprises water and including at least one of the following water soluble and/or insoluble impurities: nickel and nickel compounds, metals and the sulfides of the metals V and/or Fe, particulate carbon, soot, cyanide, formates, halides, and ammonia: the improved process for reducing the content of soluble and insoluble nickel from the grey water along with at least a portion of the other soluble and insoluble impurities comprising: (1) mixing said grey water with or without degassing and at a temperature in the range of about 60° to 220° F. with the following: (a) a water soluble material selected from the group consisting of HCHO, alkali metal polysulfide or ammonium polysulfide, and $H_2O_2$; (b) dimethyl glyoxime; (c) ferrous sulfate or ferrous chloride, and (d) a base material so as to adjust the pH of the grey water mixture to a desired value in the range of over 7 to 11; wherein a sufficient amount of the material from (a) is mixed with the waste water so that substantially all of the nickel in the soluble nickel compounds in the waste water is converted to a form which can be precipitated by the dimethyl glyoxime from (b); (2) precipitating out from the grey water mixture in (1) the following water insoluble materials: nickel-dimethyl glyoxime complex, an inorganic CN-containing sludge, iron hydroxide, and iron sulfide; and (3) separating the water insoluble materials precipitated in (2) and at least a portion of the water insoluble matter comprising nickel and its compounds, particulate carbon, soot, and the metals and the sulfides of the metals V and/or Fe from the water stream in at least one conventional solids-liquid separation means to produce a stream of clarified water having a total nickel content of less than 1 milligram per liter.

19. The process of claim 18 provided with the additional step of recycling at least a portion of the clarified water stream from (3) to said quench cooling and/or scrubbing zone.

20. The process of claim 18 provided with the additional steps of (4) increasing the pH of the clarified water stream from (3) to a minimum of 11, when the pH is below 11; and (5) steam stripping ammonia from the clarified water stream from (4) to provide a stream of $NH_3$-stripped clarified water.

21. The process of claim 20 provided with the additional steps of (6) introducing the $NH_3$-stripped clarified water stream from (5) into a conventional biological reactor after adjusting the pH to a value in the range of about 6 to 8, and consuming or converting therein organic matter to carbon dioxide and a biological residue suitable for disposal; and (7) removing the biological residue from the biological reactor, and a separate upgraded water stream.

22. The process of claim 21 provided with the step of recycling at least a portion of the upgraded water stream from (7) to the gas quench and/or scrubbing zone, and discharging the remainder from the system.

23. The process of claim 18 wherein (1) a flocculent/coagulant is also mixed with the grey water in the amount of about 1 to 10 parts per million.

24. The process of claim 18 wherein the solids-liquid separation means in (3) is selected from the group consisting of filter, centrifuge, hydroclone, settler, clarifier, and combinations thereof.

25. The process of claim 24 wherein said solids-liquid separation means comprises a plurality of hydroclones connected in parallel and/or series.

26. The process of claim 18 where the mixture in (1) comprises about 10 to 1000 milligrams of a material selected in (a) for each liter of grey water, 2 to 10 moles of dimethyl glyoxime for each atom of dissolved nickel, and ferrous sulfate or ferrous chloride measured in moles in the amount of about 1.2 to 10 times the moles of total cyanides in the grey water.

27. The process of claim 18 wherein said liquid hydrocarbonaceous fuel is selected from the group consisting of liquid hydrocarbon fuel and oxygen-containing hydrocarbonaceous fuel.

* * * * *